United States Patent
Yamashita et al.

(10) Patent No.: US 8,349,483 B2
(45) Date of Patent: Jan. 8, 2013

(54) NON AQUEOUS ELECTROLYTE SECONDARY BATTERY HAVING MULTILAYER POLYOLEFIN MEMBRANE AND ELECTROLYTE CONTAINING DINITRILE COMPOUND

(75) Inventors: Noriko Yamashita, Tokushima (JP); Masato Iwanaga, Tokushima (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/038,790

(22) Filed: Mar. 2, 2011

(65) Prior Publication Data

US 2011/0229751 A1 Sep. 22, 2011

(30) Foreign Application Priority Data

Mar. 18, 2010 (JP) ................................. 2010-061910

(51) Int. Cl.
*H01M 2/16* (2006.01)
(52) U.S. Cl. ........................................ 429/144; 429/321
(58) Field of Classification Search ........... 429/122–347
See application file for complete search history.

(56) References Cited

U.S. PATENT DOCUMENTS

2008/0193833 A1* 8/2008 Ohashi et al. ................ 429/129
2008/0220336 A1 9/2008 Mun et al.

FOREIGN PATENT DOCUMENTS

| JP | 2004-179146 A | 6/2004 |
| JP | 2008-108586 A | 5/2008 |
| JP | 2009-032653 A | 2/2009 |
| WO | 2006/038532 A1 | 4/2006 |

* cited by examiner

*Primary Examiner* — Basia Ridley
*Assistant Examiner* — Jonathan G Leong
(74) *Attorney, Agent, or Firm* — Westerman, Hattori, Daniels & Adrian, LLP

(57) ABSTRACT

A nonaqueous electrolyte secondary battery includes a positive electrode plate, a negative electrode plate, a separator, and a nonaqueous electrolytic solution. The separator is constituted of a polyolefin microporous membrane constituted of two or more layers of stacked film containing polyethylene and polypropylene, one or both of the surface layers has a polypropylene mixture proportion exceeding 50% by mass and contains inorganic particles, and the nonaqueous electrolytic solution contains a dinitrile compound expressed by $CN-(CH_2)n-CN$ (where $n \geq 1$ and n is an integer). Thus, the nonaqueous electrolyte secondary battery that even when stored at high temperature in a charged state is not prone to positive electrode degradation and has a large post-high temperature storage capacity recovery rate and good cycling characteristics can be provided.

4 Claims, 1 Drawing Sheet

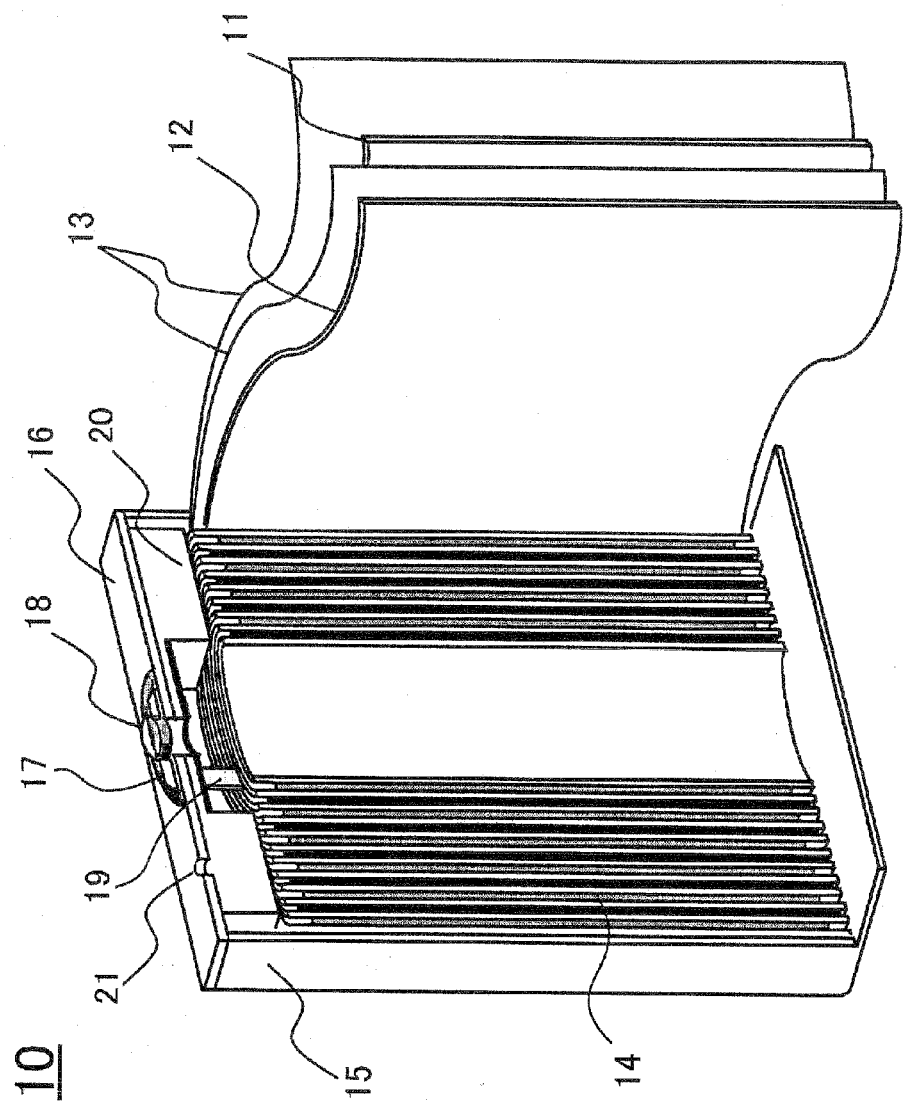

NON AQUEOUS ELECTROLYTE SECONDARY BATTERY HAVING MULTILAYER POLYOLEFIN MEMBRANE AND ELECTROLYTE CONTAINING DINITRILE COMPOUND

TECHNICAL FIELD

The present invention relates to a nonaqueous electrolyte secondary battery. More particularly, the invention relates to a nonaqueous electrolyte secondary battery in which, thanks to good cycling characteristics, degradation of the positive electrode is unlikely to occur and the capacity recovery rate is good, even when stored at high temperature in a charged state.

BACKGROUND ART

With their high energy density and high capacity, nonaqueous electrolyte secondary batteries, typified by the lithium ion secondary battery, are widely used as the power source for portable electronic equipment such as portable telephones, portable personal computers and portable music players, and further as the drive power source for hybrid electric vehicles (HEVs) and electric vehicles (EVs).

For the positive electrode active material of these nonaqueous electrolyte secondary batteries, use is made, either singly or mixed together, of $LiCoO_2$, $LiNiO_2$, $LiNi_xCO_{1-x}O_2$ (x=0.01 to 0.99), $LiMnO_2$, $LiMn_2O_4$, $LiNi_xMn_yCo_zO_2$ (x+y+z=1), $LiFePO_4$, or the like, all of which are able to reversibly absorb and desorb lithium ions.

Of these, particularly frequent use is made of the lithium-cobalt composite oxides or the dissimilar metallic element-supplemented lithium-cobalt composite oxides, since these give superior battery characteristics relative to the others. However, cobalt is expensive and exists in small amounts as a resource. Therefore, in order to continue using these lithium-cobalt composite oxides or dissimilar metallic element-supplemented lithium-cobalt composite oxides as the positive electrode active material in nonaqueous electrolyte secondary batteries, it is desired to raise the performance of nonaqueous electrolyte secondary batteries to even higher levels.

However, when a nonaqueous electrolyte secondary battery in a charged state is stored under high temperature conditions, the positive electrode is prone to degrade. This is considered to be because when a nonaqueous electrolyte secondary battery is stored in a charged state, there will occur oxidative decomposition of the nonaqueous electrolytic solution on the positive electrode active material, or elution of the transition metal ions of the positive electrode active material, and furthermore, under high temperature conditions, such decomposition of the nonaqueous electrolytic solution and elution of transition metal ions will be faster than under room temperature.

Meanwhile, JP-A-2004-179146 sets forth a case where, with the purpose of enhancing the cycling characteristics, battery capacity, high temperature storage characteristics, etc., of a nonaqueous electrolyte secondary battery, a small amount of dinitrile compound is added to the nonaqueous electrolytic solution. US Patent Publication No. 2008/0220336 sets forth a case where, with the purpose of improving the high temperature storage characteristics of a nonaqueous electrolyte secondary battery, a nonaqueous electrolytic solution that contains cyclic carbonate and dinitrile compound is used. Furthermore, JP-A-2008-108586 sets forth a case where, with the purpose of obtaining a high-capacity nonaqueous electrolyte secondary battery with superior charge-discharge cycling characteristics and storage characteristics, dinitrile compound is added to the nonaqueous electrolytic solution.

JP-A-2009-32653 sets forth a case where, with the purpose of curbing production of gases during high temperature storage and improving the cycling characteristics in a nonaqueous electrolyte secondary battery, a nonaqueous electrolytic solution is used that contains at least one compound selected from the group consisting of a compound containing from two to four nitrile groups in its structural formula; a fluorinated cyclic carbonate having two or more fluorine atoms; monofluorophosphate; and difluorophosphate.

PCT Publication No. WO2006/038532 discloses a separator that has the advantages that its impregnability with a nonaqueous electrolytic solution, mechanical strength, permeability, and high temperature storage characteristics when used in a battery, are enhanced; namely a separator constituted of a polyolefin microporous membrane constituted of two or more stacked films containing polyethylene and polypropylene, in which in one or both of the surface layers, the content of polypropylene-containing organic particles is not less than 5% by mass and not more than 90% by mass.

With the inventions disclosed in JP-A-2004-179146, US Patent Publication No. 2008/0220336, and JP-A-2008-108586, dinitrile compounds are essentially adsorbed onto the positive electrode active material in the charged state, and this is deemed to enable protection of the surface of the positive electrode active material and reduction of side reactions between the nonaqueous electrolytic solution and the positive electrode active material, and to have the effect of enhancing the various battery characteristics during high temperature storage. However, according to the results of experiments by the present inventors, when dinitrile compound is added to the nonaqueous electrolytic solution in a quantity sufficient to exert an enhancing effect on the high temperature storage characteristics, the internal resistance of the positive electrode active material is observed to increase and the cycling characteristics to decline. It is inferred that this is because the protective film is formed excessively on the surface of the positive electrode active material.

In JP-A-2009-32653, a cycling characteristic enhancement effect up to roughly 100 cycles, due to dinitrile compound, fluorinated cyclic carbonate, and fluorophosphate being contained in the nonaqueous electrolytic solution, is acknowledged, but it cannot be said that an adequate cycling characteristic enhancement effect is exerted. Hence, it is difficult to achieve both adequate high temperature storage characteristics and cycling characteristics simply by adding dinitrile compound to the nonaqueous electrolytic solution. Although in PCT Publication No. WO2006/038532, a separator is disclosed that is able to improve the high temperature storage characteristics of a nonaqueous electrolyte secondary battery, nothing is disclosed concerning cycling characteristic enhancement effects.

The present inventors conducted many and various investigations concerning the conditions under which it is possible to achieve adequate high temperature storage characteristics and cycling characteristics by adding a small amount of dinitrile compound to a nonaqueous electrolytic solution that has long been in common use. As a result, they arrived at the present invention upon discovering that, when used in combination with a separator of a particular structure among the separators disclosed in JP-A-2009-32653, it is possible to achieve adequate high temperature storage characteristics and cycling characteristics by adding a small amount of dinitrile compound to a nonaqueous electrolytic solution that has long been in common use.

SUMMARY

More precisely, an advantage of some aspects of the invention is to provide a nonaqueous electrolyte secondary battery that has a large capacity recovery rate after high temperature storage and good cycling characteristics even though using a small amount of dinitrile compound added to a nonaqueous electrolytic solution that has long been in common use.

According to an aspect of the invention, a nonaqueous electrolyte secondary battery includes a positive electrode plate and a negative electrode plate that contain material able to reversibly absorb and desorb lithium ions, a separator that separates the positive electrode plate and negative electrode plate, and a nonaqueous electrolytic solution in which a solute constituted of lithium salt is dissolved in an organic solvent. The separator is constituted of a polyolefin microporous membrane constituted of two or more layers of stacked film containing polyethylene and polypropylene, one or both of the surface layers has a polypropylene mixture proportion exceeding 50% by mass and contains inorganic particles, and the nonaqueous electrolytic solution contains not less than 0.1% by mass and not more than 3.0% by mass, relative to mass of the nonaqueous solvent of the nonaqueous electrolytic solution, of a dinitrile compound expressed by structural formula (I) below:

$$CN-(CH_2)n-CN \qquad (I)$$

(where $n \geq 1$ and n is an integer).

When a small amount of dinitrile compound is contained in the nonaqueous electrolytic solution, a nonaqueous electrolyte secondary battery is obtained that has good high temperature storage characteristics such as residual capacity and recovery capacity after high temperature storage in a charged state, but when dinitrile compound is added in an amount that will exert the effect of enhancing the high temperature storage characteristics, the protective film on the positive electrode active material surface will be formed excessively, with the result that the internal resistance increases and the cycling characteristics decline. With the nonaqueous electrolyte secondary battery of the invention, a small amount of dinitrile compound is contained in the nonaqueous electrolytic solution, and furthermore the separator used is constituted of a polyolefin microporous membrane constituted of two or more layers of stacked film containing polyethylene and polypropylene, in one or both of the surface layers has a polypropylene mixture proportion exceeding 50% by mass and contains inorganic particles. Thanks to this, with the invention a nonaqueous electrolyte secondary battery is obtained that has superior cycling characteristics and also a large capacity recovery rate after high temperature storage.

Note that if the proportion of dinitrile compound contained in the nonaqueous electrolyte is under 0.1% by mass relative to the mass of the nonaqueous solvent of the nonaqueous electrolytic solution, the advantageous effects of adding dinitrile compound will not be exerted, while if the proportion exceeds 3.0% by mass, then although the high temperature storage characteristics will be good the cycling characteristics will be lower than if no dinitrile compound were added. Therefore, such proportions are not desirable.

For the dinitrile compound used in the nonaqueous electrolyte secondary battery of this aspect of the invention, any item expressed by General Formula (1) above may be selected as appropriate. However, in consideration of availability and cost, a dinitrile compound with n=1 to 10 or so, more precisely, one from among malononitrile (n=1), succinonitrile (n=2), glutaronitrile (n=3), adiponitrile (n=4), pimelonitrile (n=5), suberonitrile (n=6), azelanitrile (n=7), sebaconitrile (n=8), undecanenitrile (n=9), and dodecanenitrile (n=10), will be preferable.

A separator with polypropylene content under 50% by mass will be undesirable because this will result in poor oxidation resistance, which will lead to decline in high-temperature storage characteristics. It will be preferable, as hinted in PCT Publication No. WO2006/038532, to use a content of not less than 5% by mass and not more than 60% by mass for the inorganic particles in the membrane with polypropylene as main constituent. For these inorganic particles, an oxide or nitride of silicon, of aluminum, or of titanium will be preferable. In addition, the polyethylene in the separator is necessary in order to impart shutdown characteristics in the event of high temperature.

For the positive electrode active material constituted of material able to reversibly absorb and desorb lithium ions that can be used in the nonaqueous electrolyte secondary battery of the aspect of the invention, a positive electrode active material that has long been in common use, as mentioned above, can be used unchanged. As the negative electrode active material constituted of material able to reversibly absorb and desorb lithium ions that can be used in the nonaqueous electrolyte secondary battery of the aspect of the invention, one may cite graphite, non-graphitizable carbon, graphitizable carbon or other carbon material; $LiTiO_2$, $TiO_2$ or other titanium oxide; silicon, tin or other metalloid elements; Sn—Co alloy; or the like.

As examples of the nonaqueous solvent that can be used in the nonaqueous electrolyte secondary battery of the aspect of the invention, one may cite cyclic carbonate ester such as ethylene carbonate (EC), propylene carbonate (PC), butylene carbonate (BC) and the like; fluorinated cyclic carbonate ester; cyclic carboxylic ester such as γ-butyl lactone (γ-BL), and γ-valerolactone (γ-VL); chain carbonate ester such as dimethyl carbonate (DMC), ethylmethyl carbonate (EMC), diethyl carbonate (DEC), methylpropyl carbonate (MPC), and dibutyl carbonate (DBC); fluorinated chain carbonate ester; chain carboxylic ester such as pivalic acid methyl, pivalic acid ethyl, methylisobutylate, and methylproprionate; amide compound such as N,N'-dimethylformamide, and N-methyloxazolidinone; sulphuric compound such as sulfolane; or ambient temperature molten salt such as tetrafluoroboric acid 1-ethyl-3-methyl imidazolium. It is preferable that two or more of these be used mixed together. Among these, cyclic carbon ester and chain carbon ester, which have high permittivity and conductivity of the nonaqueous electrolytic solution ions, will be particularly preferable.

Note that as a compound for stabilizing the electrodes, vinylene carbonate (VC), vinylethyl carbonate (VEC), succinic anhydride (SUCAH), maleic anhydride (MAAH), glycolic anhydride, ethylene sulphite (ES), divinyl sulfone (VS), vinyl acetate (VA), vinyl pivalate (VP), catechol carbonate, biphenyl (BP), or the like may further be added to the nonaqueous electrolytic solution used in the nonaqueous electrolyte secondary battery of the aspect of the invention. Two or more of these compounds mixed together as appropriate can also be used.

For the electrolyte salt that is dissolved in the nonaqueous solvent used in the nonaqueous electrolyte secondary battery of the aspect of the invention, a lithium salt that is commonly used as electrolyte salt in nonaqueous electrolyte secondary batteries can be used. As examples of such lithium salt, one may cite $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and the like, or a mixture of these. Of these, $LiPF_6$ (lithium hexafluorophosphate) is particularly preferable. It is preferable that the amount of electrolyte salt dissolved be 0.5 to 2.0 mol/L relative to the nonaqueous solvent.

Furthermore, the nonaqueous electrolytic solution in the nonaqueous electrolyte secondary battery of the aspect of the invention may, besides an item in the liquid state, alternatively be a gelled item.

It is preferable, in the nonaqueous electrolyte secondary battery of the aspect of the invention, that the dinitrile compound be contained in the nonaqueous electrolyte in a proportion of not less than 0.1% by mass and not more than 3.0% by mass relative to the mass of the nonaqueous solvent of the nonaqueous electrolytic solution.

If the proportion of dinitrile compound contained in the nonaqueous electrolytic solution is under 0.1% by mass relative to the mass of the nonaqueous solvent of the nonaqueous electrolytic solution, the advantageous effects of adding the dinitrile compound will not be exerted, while if the proportion exceeds 3.0% by mass, the cycling characteristics will decline, although the high temperature storage characteristics will be good. This means that with the nonaqueous electrolyte secondary battery of the aspect of the invention, by causing the dinitrile compound content proportion to be not less than 0.1% by mass and not more than 3.0% by mass relative to the mass of the nonaqueous solvent of the nonaqueous electrolytic solution, a nonaqueous electrolyte secondary battery can be obtained that has superior cycling characteristics and also has a good capacity recovery rate after high temperature storage. Furthermore, if the dinitrile compound content proportion is caused to be not less than 0.1% by mass and not more than 2.0% by mass relative to the mass of the nonaqueous solvent of the nonaqueous electrolytic solution, then the cycling characteristics and the capacity recovery rate after high temperature storage will be even better.

BRIEF DESCRIPTION OF THE DRAWINGS

The invention will be described with reference to the accompanying drawing, wherein like numbers reference like elements.

FIG. 1 is a perspective view of a nonaqueous electrolyte secondary battery, shown cut in the lengthwise direction, which was used for determining the various battery characteristics in the Examples and Comparative Examples.

DESCRIPTION OF EXEMPLARY EMBODIMENTS

Exemplary embodiments of the invention will now be described in detail with reference to examples and comparative examples. However, the embodiments described below are merely illustrative examples of nonaqueous electrolyte secondary batteries that embody the technical concepts of the invention, and are not intended to limit the invention to these particular nonaqueous electrolyte secondary batteries. The invention can equally well be applied to numerous variants without departing from the technical concepts set forth in the claims.

First, the specific method for manufacturing a nonaqueous electrolyte secondary battery, which is common to all the Examples and Comparative Examples, will be described.

Preparation of Positive Electrode Plate

For the positive electrode active material, a mixture of dissimilar element-supplemented lithium cobalt oxide and layered lithium-nickel-manganese-cobalt composite oxide was used. The dissimilar element-supplemented lithium cobalt oxide was prepared as follows. As regards the starting materials, lithium carbonate ($Li_2CO_3$) was used for the lithium source, while for the cobalt source, Zr- and Mg-supplemented tricobalt tetraoxide ($CO_3O_4$) was used that was obtained by coprecipitation, followed by thermal decomposition, from an aqueous solution with 0.2 mol % of Zr and 0.5 mol % of Mg, relative to the Co, added as dissimilar elements during synthesis of cobalt carbonate. These were weighed out into particular amounts and mixed together, then baked for 24 hours at 850° C. in an air atmosphere to obtain Zr- and Mg-supplemented lithium cobalt oxide. This was then ground in a mortar to an average particle size of 14 μm, producing positive electrode active material A.

The stratified lithium-nickel-manganese-cobalt composite oxide was prepared as follows. As regards the starting materials, lithium carbonate ($Li_2CO_3$) was used for the lithium source, while for the transition metal source, a coprecipitated hydroxide expressed by $Ni_{0.33}Mn_{0.33}Cu_{0.34}(OH)_2$ was used. These were weighed out into particular amounts and mixed together, then baked for 20 hours at 1000° C. in an air atmosphere to obtain a layered lithium-nickel-manganese-cobalt composite oxide expressed by $LiNi_{0.33}Mn_{0.33}Cu_{0.34}O_2$. This was then ground in a mortar to an average particle size of 5 μm, producing positive electrode active material B.

The positive electrode active material A and positive electrode active material B thus obtained were mixed together in the proportion 7:3 by mass. Next, such positive electrode active material mixture was mixed, so as to constitute 94 parts by mass, with 3 parts by mass of carbon powder serving as conducting agent and 3 parts by mass of polyvinylidene fluoride (PVdF) powder serving as binding agent, then the resulting mixture was mixed into N-methylpyrrolidone (NMP) solution to prepare a slurry. This slurry was applied by the doctor blade method to both faces of a 15 μm thick positive electrode collector made of aluminum, and dried to form active material layers on both faces of the positive electrode collector. The resulting item was then compressed using a compression roller to produce a positive electrode plate with short side length of 36.5 mm.

Preparation of Negative Electrode Plate

Ninety-six parts by mass of graphite powder serving as negative electrode active material, 2 parts by mass of carboxymethylcellulose serving as thickener, and 2 parts by mass of styrene-butadiene rubber (SBR; styrene:butadiene=1:1) serving as binding agent were dispersed in water to prepare a slurry. This slurry was applied by the doctor blade method to both faces of an 8 μm thick negative electrode collector made of copper, and dried to form active material layers on both faces of the negative electrode collector. The resulting item was then compressed using a compression roller to produce a negative electrode plate with short side length of 37.5 mm.

Note that the potential of graphite is 0.1 V relative to lithium. The active material packing amounts in the positive electrode plate and the negative electrode plate were adjusted so that the ratio of the positive electrode plate and negative electrode plate charging capacities (negative electrode charging capacity divided by positive electrode charging capacity) was 1.1 at the potential of the positive electrode active material, as design standard.

Preparation of Nonaqueous Electrolytic Solution

The nonaqueous electrolytic solution was prepared by dissolving 1 mol/L of $LiPF_6$ in a mixed solvent of ethylene carbonate (EC), diethyl carbonate (DEC), and methylethyl carbonate (MEC) in the proportions 20:30:50 by volume, and afterward, in the cases where dinitrile compound was added, adding such compound to form a particular content proportion with respect to the total mass of the electrolyte. Adiponitrile (CN—(CH$_2$)$_4$—CN) was used as the dinitrile compound. The adiponitrile content proportions in the nonaqueous electrolytic solution that were used in the various Examples and Comparative Examples are listed in Table 1.

Preparation of Separator

For the layers having polypropylene in a mixture proportion exceeding 50% by mass and containing inorganic particles, which was used in the Examples 1 to 4 and Comparative Example 1, a mixture constituted of polyethylene, polypropylene, silica as the inorganic matter, and a plasticizing agent was used. For the other layer, a mixture constituted of polyethylene and a plasticizing agent was used. The separator was fabricated so as to be a three-layer separator in which layers having polypropylene in a mixture proportion exceeding 50% by mass and containing inorganic particles were disposed as surface layers on both faces, by using the coextrusion method to form, while mixing and thermally melting, the various layers into a sheet and afterward stretching the resulting sheet.

The separator containing no polypropylene which was used in Comparative Examples 2 and 3 was fabricated by extruding, while mixing and thermally melting, the polyethylene and plasticizing agent to form a sheet, then removing the plasticizing agent by extraction and drying, and stretching the sheet. That is, the separator used in Comparative Examples 2 and 3 was a polyethylene single-layer structure separator containing no inorganic particles, such as has long been commonly used in nonaqueous electrolyte secondary batteries.

Preparation of Battery

A prismatic nonaqueous electrolyte secondary battery (measuring 5.5 mm×34 mm×43 mm) of the structure set forth below was fabricated as follows. The positive electrode plate and negative electrode plate were spirally wound, with the separator appropriate for the particular example or comparative example interposed therebetween, then crushed to form a flat wound electrode assembly, which was then put into a metallic prismatic outer can, into which the electrolytic solution was then poured. The design capacity of the nonaqueous electrolyte secondary battery thus obtained was 800 mAh with charging voltage of 4.4 V.

FIG. 1 is a perspective view that shows, cut in the lengthwise direction, a prismatic nonaqueous electrolyte secondary battery that was used to determine the various battery characteristics in the Examples 1 to 4 and the Comparative Examples 1 to 3. In this nonaqueous electrolyte secondary battery 10, a flat wound electrode assembly 14 constituted of a positive electrode plate 11 and a negative electrode plate 12 that are spirally wound with a separator 13 interposed therebetween is housed inside a prismatic battery outer can 15, and the battery outer can 15 is sealed by a sealing plate 16. The wound electrode assembly 14 is, for example, wound so that the positive electrode plate 11 is located outermost and is exposed, and the exposed outermost positive electrode plate 11 contacts directly with and is electrically connected to the inner surface of the battery outer can 15, which serves also as a positive electrode terminal. In addition, the negative electrode plate 12 is electrically connected, via a negative electrode tab 19, to a negative electrode terminal 18 that is formed at the center of the sealing plate 16 and installed with an insulator 17 interposed.

The battery outer can 15 is electrically connected to the positive electrode plate 11, and so, in order to prevent short-circuiting between the negative electrode plate 12 and the battery outer can 15, an electrically insulated state is created between the negative electrode plate 12 and the battery outer can 15 by the insertion of an insulating spacer 20 between the top edge of the wound electrode assembly 14 and the sealing plate 16. In some cases the arrangement of the positive electrode plate 11 and the negative electrode plate 12 will be reversed. This prismatic nonaqueous electrolyte secondary battery 10 is fabricated by inserting the wound electrode assembly 14 into the battery outer can 15, laser-welding the sealing plate 16 to the mouth portion of the battery outer can 15, then pouring the nonaqueous electrolytic solution through an electrolyte pour hole 21 and sealing the electrolyte pour hole 21.

When the various batteries were fabricated according to the foregoing procedure, addition of adiponitrile as dinitrile compound to the nonaqueous electrolytic solution, for those batteries using a three-layer structure separator containing polypropylene and inorganic particles in the surface layers, was as follows: for the Comparative Example 1, none was added; for the Example 1, 0.2% by mass was added; for the Example 2, 1.0% by mass was added; for the Example 3, 2.0% by mass was added; and for the Example 4, 3.0% by mass was added. Similarly, for those batteries using a polyethylene single-layer structure separator containing no polypropylene nor inorganic particles, no dinitrile compound was added to the nonaqueous electrolytic solution in the Comparative Example 2, and 1.0% by mass of adiponitrile as dinitrile compound was added in the Comparative Example 3.

Measurement of Cycling Characteristic

The cycling characteristic of each of the batteries fabricated in the foregoing manner for the Examples 1 to 4 and the Comparative Examples 1 to 3 was determined as follows. First, each battery was charged at 25° C. at a constant current of 1 It=800 mA until the battery voltage reached 4.4 V (the positive electrode potential being 4.5 V relative to lithium). After the battery voltage reached 4.4 V, the battery was charged at a constant voltage of 4.4 V until the charging current reached 20 mA, to obtain a fully charged battery. Then the battery was discharged at a constant current of 1 It until the battery voltage reached 3.0 V. Such charging and discharging were taken to constitute one cycle, and the discharge capacity of the first cycle was measured. The foregoing charge-discharge cycle was carried out repeatedly, and the discharge capacity of the 300$^{th}$ cycle was determined. The ratio of the discharge capacity of the 300$^{th}$ cycle to the discharge capacity of the first cycle was derived as the post-cycling residual capacity (%), which served as the cycling characteristic. The greater the post-cycling residual capacity, the less is the degradation of the battery and the better are the cycling characteristics. The results are listed in Table 1.

Measurement of High Temperature Storage Characteristic

Each of the batteries in the Examples 1 to 4 and the Comparative Examples 1 to 3 underwent one charge-discharge cycle under the same conditions as in the above-described cycling test. After that, the battery was once more charged at constant current of 1 It until the battery voltage reached 4.4 V, then charged at constant voltage of 4.4 V until the charging current reached 20 mA and the battery was in the fully charged state. Then the fully charged battery was stored in a thermostatic chamber maintained at 60° C. for 20 days. After such 20-day storage, the battery was left to cool down to a battery temperature of 25° C. Next, the battery was charged at a constant current of 1 It until the battery voltage reached 4.4 V, then was charged at constant voltage of 4.4 V until the charging current reached 20 mA. After that, the battery was discharged at a constant current of 1 It until the battery voltage reached 3.0 V.

The discharge capacity at this point, taken as the post-high temperature storage capacity, was determined, and the ratio of the post-high temperature storage capacity to the first cycle discharge capacity was derived as the post storage capacity recovery rate (%), which served as the high temperature storage characteristic. The lower the post-storage capacity recovery rate, the greater is the degradation of the positive electrode. The results are listed in Table 1.

TABLE 1

|  | Surface layer PP mixture proportion | Inorganic particles (silica) | Dinitrile compound (adiponitrile) | Post-cycling residual capacity | Post-high temperature charged storage capacity recovery rate |
| --- | --- | --- | --- | --- | --- |
| Comparative Example 1 | 60% | Present | None | 80% | 70% |
| Example 1 | 60% | Present | 0.2% by mass | 84% | 88% |
| Example 2 | 60% | Present | 1.0% by mass | 84% | 87% |
| Example 3 | 60% | Present | 2.0% by mass | 83% | 88% |
| Example 4 | 60% | Present | 3.0% by mass | 79% | 86% |
| Comparative Example 2 | 0 | Absent | None | 77% | 66% |
| Comparative Example 3 | 0 | Absent | 1.0% by mass | 71% | 68% |

PP: Polypropylene

The following can be seen from the results set forth in Table 1. Comparing the results for the Comparative Examples 2 and 3, which used a separator constituted of a polyethylene single layer containing no inorganic particles, such as has long been in common use, the Comparative Example 3, in which dinitrile compound was added to the nonaqueous electrolytic solution, had a slightly higher post-high temperature storage capacity recovery rate than the Comparative Example 2, in which no dinitrile compound was added, but had a lower post-cycling residual capacity. This supplies further evidence for the aforementioned issue that the inventors discovered with regard to adding dinitrile compound to the nonaqueous electrolytic solution, namely the fact that when dinitrile compound is added to the nonaqueous electrolytic solution in a quantity that will exert adequate enhancing effects on the high temperature storage characteristics, the protective film on the positive electrode active material surface is formed excessively, with the result that the internal resistance increases and the cycling characteristics decline.

With the battery of the Comparative Example 1, which had no dinitrile compound added to the nonaqueous electrolytic solution but used a three-layer structure separator containing polypropylene and inorganic particles in the surface layers, better effects were obtained for both the post-cycling residual capacity and the post-high temperature storage capacity recovery rate than with the battery of the Comparative Example 2, which used a polyethylene single layer separator containing no inorganic particles, such as has long been in common use. This is deemed to indicate that a three-layer structure separator containing polypropylene and inorganic particles in the surface layers not only has an improving effect on the high temperature storage characteristics but also has the effect of enhancing the cycling characteristics to a certain degree.

By contrast, with the batteries that used a three-layer structure separator containing polypropylene and inorganic particles in the surface layers and had 0.2% by mass (Example 1), 1.0% by mass (Example 2), or 2.0% by mass (Example 3) of adiponitrile as dinitrile compound added to the nonaqueous electrolytic solution, better effects were obtained for both the post-cycling residual capacity and the post-high temperature storage capacity recovery rate than with the battery of the Comparative Example 1, which had no dinitrile compound added to the nonaqueous electrolytic solution.

Comparing the advantageous effects of the batteries in the Comparative Examples 2 and 3, a decline in the cycling characteristics might be expected when dinitrile compound is added to the nonaqueous electrolytic solution. Nevertheless, with the batteries of the Examples 1 to 3, better cycling characteristics were obtained than with the battery of the Comparative Example 1, thanks to the addition of dinitrile compound to the nonaqueous electrolytic solution, unlike the battery of the Comparative Example 1. This indicates that in the batteries of the Examples 1 to 3, the advantageous effect of adding dinitrile compound to the nonaqueous electrolytic solution and the advantageous effect of using a three-layer structure separator containing polypropylene and inorganic particles in the surface layers arise synergistically.

Note that with the battery of the Example 4, which used a three-layer structure separator containing polypropylene and inorganic particles in the surface layers and had 3.0% by mass of adiponitrile added as dinitrile compound to the nonaqueous electrolytic solution, the high temperature storage characteristic was extremely good but the cycling characteristic was lower, almost the same as with the battery of the Comparative Example 1, than that of the Example 3, which had 2.0% by mass of adiponitrile added. It will thus be understood that the amount of dinitrile compound that should be added to the nonaqueous electrolytic solution is preferably not less than 0.1% by mass and not more than 3.0% by mass, or more preferably, not less than 0.1% by mass and not more than 2.0% by mass.

In the foregoing examples and comparative examples, only examples in which adiponitrile was used have been described in the cases where dinitrile compound was employed. However, since the above-described effects produced by the dinitrile compound arise from the presence of cyano groups at both ends of the molecules, such effects will arise in the same manner not only with adiponitrile but also with a dinitrile compound expressed by $CN-(CH_2)n-CN$ (where $n \geq 1$ and n is an integer). In the Examples and Comparative Examples above, inorganic particles constituted of silica were used by way of example, but another item can be used, provided that it is insulative and does not readily react with the nonaqueous electrolytic solution. For example, silicon nitride, or an oxide or nitride of aluminum or titanium, can be used.

Although cases of prismatic nonaqueous electrolyte secondary batteries that use a flat wound electrode assembly were described in the Examples and Comparative Examples, the invention is not dependent on the shape of the electrode assembly of the nonaqueous electrolyte secondary battery. Accordingly, the invention is also applicable to a circular or ellipsoidal nonaqueous electrolyte secondary battery using a wound electrode assembly or to a stack-type nonaqueous electrolyte secondary battery having a stack of a positive electrode plate and a negative electrode plate with a separator interposed, besides other like batteries.

In the Examples and Comparative Examples, a mixture of dissimilar element-supplemented lithium cobalt oxide and layered lithium-nickel-manganese-cobalt composite oxide, with a high charging voltage of 4.4 V (the positive electrode potential being 4.5 V relative to lithium), was used as the positive electrode active material by way of example. However, the reason why such positive electrode active material was used was that a high charging voltage promotes the reactions of the dinitrile compound on the positive electrode active material surface, and therefore the effects of adding the dinitrile compound can be determined in a short time.

Accordingly, the nonaqueous electrolyte secondary battery of the invention is equally applicable to cases where an item able to reversibly absorb and desorb lithium ions that has long been in common use as positive electrode active material is used, such as $LiCoO_2$, $LiNiO_2$, $LiNi_xCo_{1-x}O_2$ (x=0.01 to 0.99), $LiMnO_2$, $LiMn_2O_4$, $LiNi_xMn_yCo_zO_2$ (x+y+z=1), or $LiFePO_4$, or the like.

What is claimed is:

1. A nonaqueous electrolyte secondary battery comprising:
   a positive electrode plate and a negative electrode plate that contain material able to reversibly absorb and desorb lithium ions;
   a separator that separates the positive electrode plate and negative electrode plate; and
   a nonaqueous electrolytic solution in which a solute constituted of lithium salt is dissolved in an organic solvent;
   the separator being constituted of a polyolefin microporous membrane constituted of three or more layers of stacked film containing polyethylene and polypropylene, the membrane having two surface layers, wherein one is on each of its sides,
   each of the surface layers having a polypropylene mixture proportion exceeding 50% by mass of the surface layer and containing inorganic particles content of not less than 5% by mass and less than 50% by mass of the surface layer, and
   the nonaqueous electrolytic solution containing not less than 0.1% by mass and not more than 3.0% by mass, relative to the mass of the nonaqueous solvent of the nonaqueous electrolytic solution, of a dinitrile compound expressed by structural formula (I) below:

$$CN-(CH_2)_n-CN \qquad (I)$$

(where n≧1 and n is an integer).

2. The nonaqueous electrolyte secondary battery according to claim 1, wherein the dinitrile compound is contained in the nonaqueous electrolytic solution in a proportion of not less than 0.1% by mass and not more than 2.0% by mass relative to the mass of the nonaqueous solvent of the nonaqueous electrolytic solution.

3. The nonaqueous electrolyte secondary battery according to claim 1, wherein the positive electrode active material contains a mixture of dissimilar element-supplemented lithium cobalt oxide and layered lithium-nickel-manganese-cobalt composite oxide.

4. The nonaqueous electrolyte secondary battery according to claim 3, wherein the dissimilar element-supplemented lithium cobalt oxide is Zr- and Mg-supplemented lithium cobalt oxide.

* * * * *